(12) United States Patent
Joe et al.

(10) Patent No.: US 7,996,129 B2
(45) Date of Patent: Aug. 9, 2011

(54) VEHICULAR BEHAVIOR CONTROLLER

(75) Inventors: Shinichiro Joe, Yokohama (JP);
Yoshitaka Deguchi, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 351 days.

(21) Appl. No.: 12/279,322

(22) PCT Filed: Feb. 16, 2007

(86) PCT No.: PCT/IB2007/050523
§ 371 (c)(1),
(2), (4) Date: Sep. 19, 2008

(87) PCT Pub. No.: WO2007/093973
PCT Pub. Date: Aug. 23, 2007

(65) Prior Publication Data
US 2009/0118907 A1    May 7, 2009

(30) Foreign Application Priority Data
Feb. 17, 2006 (JP) ................................. 2006-041095

(51) Int. Cl.
*B60W 30/10* (2006.01)

(52) U.S. Cl. .............................. 701/42; 701/41; 701/36
(58) Field of Classification Search ............ 701/72, 701/38, 42, 41, 36, 90, 91, 37, 70, 82–34
See application file for complete search history.

(56) References Cited

U.S. PATENT DOCUMENTS

| 5,227,974 A | 7/1993 | Tomoda et al. |
| 5,307,888 A * | 5/1994 | Urvoy ............................ 180/6.2 |
| 5,640,324 A * | 6/1997 | Inagaki .......................... 701/70 |
| 5,702,167 A * | 12/1997 | Muller .......................... 312/221 |
| 6,466,857 B1 | 10/2002 | Belvo |
| 6,567,748 B2 * | 5/2003 | Matsuno ....................... 701/301 |
| 7,058,492 B1 * | 6/2006 | Yasui et al. .................... 701/38 |
| 2003/0230933 A1 | 12/2003 | Schneider et al. |
| 2004/0162650 A1 | 8/2004 | Kueperkoch et al. |
| 2006/0041367 A1 * | 2/2006 | Ono et al. ...................... 701/75 |
| 2007/0050112 A1 * | 3/2007 | Kroehnert et al. .............. 701/41 |

FOREIGN PATENT DOCUMENTS

| EP | 0 379 143 A1 | 7/1990 |
| EP | 0 551 891 A2 | 7/1993 |
| JP | 63-184573 | 7/1988 |
| JP | HEI 5-238403 | 9/1993 |
| JP | HEI 10-210604 | 8/1998 |
| JP | 2000-071737 | 3/2000 |
| JP | 2003-312319 | 11/2003 |
| JP | 2005-306284 | 11/2005 |

* cited by examiner

*Primary Examiner* — Thomas Black
*Assistant Examiner* — Marthe Marc Coleman
(74) *Attorney, Agent, or Firm* — Young Basile

(57) ABSTRACT

A vehicular behavior controller is disclosed. The controller comprises a turning force application mechanism and a stabilization controller. The turning force application mechanism applies a turning force to a vehicle. The stabilization controller is operable to regulate the turning force application mechanism in such a manner that a turning characteristic and a straight travel property of the vehicle are stabilized while in an unstable velocity area when the velocity of the vehicle exceeds a stable limit velocity.

9 Claims, 9 Drawing Sheets

VEHICULAR BEHAVIOR CONTROLLER

CROSS-REFERENCE TO RELATED APPLICATIONS

This application claims priority from Japanese Patent Application Serial No. 2006-041095 filed Feb. 17, 2006, the disclosure of which, including its specification, drawings and claims, is incorporated herein by reference in its entirety.

TECHNICAL FIELD

The present disclosure generally pertains to the field of vehicular behavior controllers.

BACKGROUND

To improve turning performance and emergency obstacle avoidance performance of a vehicle, a known 4-wheel steering device includes 4-wheel steering mechanisms for regulating wheel turning angles of the four wheels to achieve a maximum avoidance performance in the event of an emergency. In addition, a drive controller is known that utilizes a difference in a driving force between the left and the right wheels for yaw rate control when making a turn. Examples of such drive controllers may be found in Japanese patent application nos. 5-238403 and 10-210604.

However, in a typical vehicle including the aforementioned conventional technology, the vehicle is designed to have an understeering property up to a low oversteering property. Thus, its yaw motion performance is lower than that of a vehicle with a high oversteering property when the center of gravity is placed toward the rear of the vehicle, for example. Accordingly, there is still a further need for improvement for turning and avoidance performance in a variety of vehicles.

SUMMARY

A vehicular behavior controller is disclosed. The controller comprises a turning force application mechanism and a stabilization controller. The turning force application mechanism applies a turning force to a vehicle. The stabilization controller is operable to regulate the turning force application mechanism in such a manner that a turning characteristic and a straight travel property of the vehicle are stabilized while in an unstable velocity area when the velocity of the vehicle exceeds a stable limit velocity.

In the present disclosure, the amount of operation of the turning force application mechanism in the direction that stabilizes the turning characteristic and straight travel property is regulated while in the unstable velocity area. That is, in one embodiment, while a difference in the transverse forces of the tires is created between an outside tire and an inside tire according to changes in load when making a turn, a yaw moment is created in an opposite direction to the turning direction when the difference in the transverse forces acts upon the vehicle body in its length direction due to a given steering angle. The yaw moment can be offset using less forced by taking advantage of the high level of the yaw motion characteristic of a vehicle with a high oversteering characteristic, wherein the unstable velocity is below the limit velocity of the vehicle, whereby a greater yaw moment is created in a situation where a quick turn is needed for the purpose of emergency avoidance, for example, and the stabilization controller operates to attain a desired steady turning characteristic in the convention manner in a situation where normal stable turning without quick turning or when a straight travel property is needed.

As a result, an unprecedented higher level of turning performance can be realized while facilitation vehicle stabilization.

BRIEF DESCRIPTION OF DRAWINGS

Other features and advantages of the present system will be apparent from the ensuing description, taken in conjunction with the accompanying drawings, in which.

DETAILED DESCRIPTION

Figure 1:
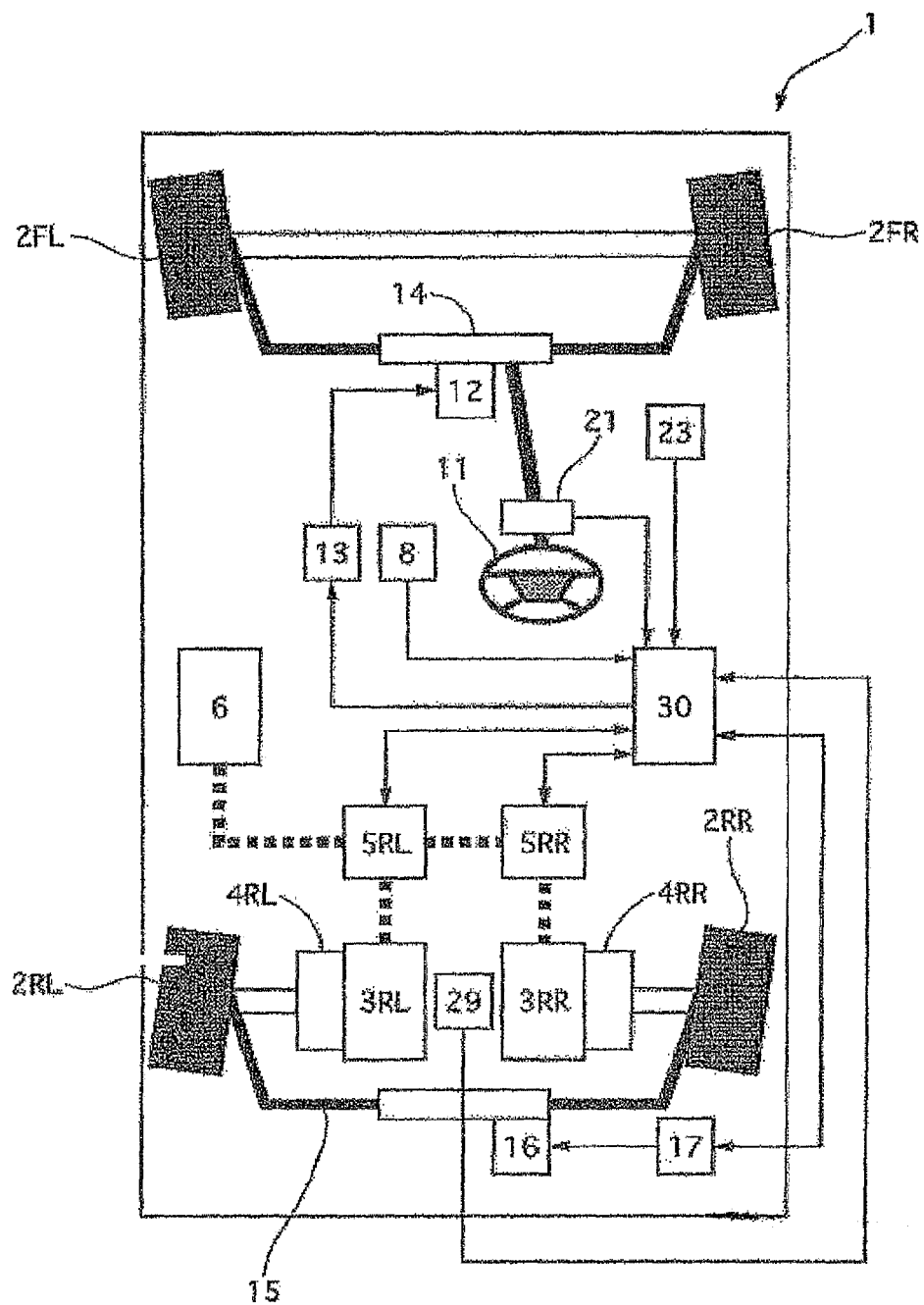
FIG. 1 is a configuration diagram of a vehicle to which a first embodiment of a vehicular behavior controller is applied.

While the claims are not limited to the illustrated embodiments, an appreciation of various aspects of the system is best gained through a discussion of various exampled thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present disclosure are described in detail by referring to the drawings as follows.

FIG. 1 is a configuration diagram of a vehicle 1 to which a vehicular behavior controller of the first embodiment is applied. Here, the vehicle 1 is an electric automobile in which the right and left rear wheels 2RL, 2RR, may be driven independently using separate electric motors.

As shown in FIG. 1, vehicle 1 is equipped with electric motors 3RL and 3RR. (Electric motors 3RL and 3RR are also referred to as the turning force application mechanism for applying turning forces to the vehicle. Hereinafter, they will be abbreviated as motors.) Rotary shafts of the respective motors are connected to rear wheels 2RL and 2RR via velocity reducers 4RL and 4RR. The output characteristics of the two motors 3RL and 3RR, the velocity reduction ratios of the two velocity reducers 4RL and 4RR, and the radii of the wheels 2RL, 2RR are all set to be identical.

Motors 3RL and 3RR are both 3-phase synchronous motors with permanent magnets encased in a rotor. Drive circuits 5RL and 5RR regulate the exchange of electric power between motors 3RL and 3RR and a lithium-ion battery 6 to adjust the powering and regenerative torques of motors 3RL and 3RR in such a manner that torque command values tTRL (left rear wheel) and tTRR (right rear wheel) received from an integration controller 30 (also referred to as a stabilization controller) match each other. Drive circuits 5RL and 5RR transmit output torques of motors 3RL and 3RR. Motor rotation velocities detected by rotational position sensors (not shown) are attached to the motor rotary shafts and are operatively connected to integration controller 30.

Front wheels 2FL and 2FR are mainly steered via a steering gear 14 according to rotary motions of steering wheel 11 as actuated by a driver. An auxiliary steering motor 12 is used to displace the steering gear 14 in the vehicle width direction (left-right) to assist the steering. That is, the steering angle of front wheels 2FL and 2FR is equal to the sum of the main steering angle created by steering wheel 11 and the auxiliary steering angle created by auxiliary steering motor 12. A control circuit 13 regulates the output of auxiliary steering motor 12 to control the front wheel steering angle to match a target front wheel steering angle tDF transmitted thereto from integration controller 30.

Rear wheels 2RL and 2RR are steered by displacing an entire steering rack 15 in the vehicle width direction using a steering motor 16. A control circuit 17 regulates the output of steering motor 16 to control the steering angle to match a target rear wheel steering angle tDR transmitted from integration controller 30.

An accelerator opening level signal AP0 is detected by an accelerator pedal sensor 23. A steering wheel rotation angle signal STR is detected by a steering angle sensor 21 attached to the rotary shaft of steering wheel 11. A yaw signal $\gamma$ is detected by yaw rate sensor 8. The accelerator opening level signal AP0, the steering wheel rotation angle signal STR and the yaw rate signal $\gamma$ are input to integration controller 30.

Vehicle 1 of the first embodiment has a high oversteering property, and vehicle parameters (vehicle weight m, front wheel concerning power $K_f$, rear wheel cornering power $K_r$, wheel base length L, distance $L_f$ from the center of gravity to the front wheel shaft, distance $L_r$ from the center of gravity to the rear wheel shaft and rear wheel tread width $L_t$) are set in such a manner that a stable limit velocity is set lower than a limit velocity of the vehicle (maximum velocity capability of the vehicle). Here, stable limit velocity $V_c$ refers to the vehicle velocity beyond which the transverse motion characteristic of the vehicle becomes unstable, and it may be expressed by Equation (1) given below based on the premise of linear analyses described in a Japanese published article entitled "Motions of a vehicle and controls thereof" by Masato Abe and published by Sankaido Publishing.

$$V_c = \sqrt{\frac{2K_f K_r L^2}{m(L_f K_f - L_r K_r)}} \quad (1)$$

$V_c$ is the velocity at which the real part of the unique value in the stated formula described the vehicular motions changes from negative to positive as the vehicle velocity is increased gradually. According to Equation (1), $V_c$ is absent when $L_f \cdot K_f - L_r \cdot K_r$ is negative, and the vehicle characteristic is stable without being controlled regardless of the vehicle velocity. On the other hand, $V_c$ is present when $L_f \cdot K_f - L_r \cdot K_r$ is positive, and the vehicle characteristic becomes unstable if not controlled.

However, $V_c$ is not fixed at the value shown by Equation (1), and it changes when a linear area is exceeded due to a given turning state of the vehicle 1 or due to a property not considered in the linear analyses.

Figure 2:
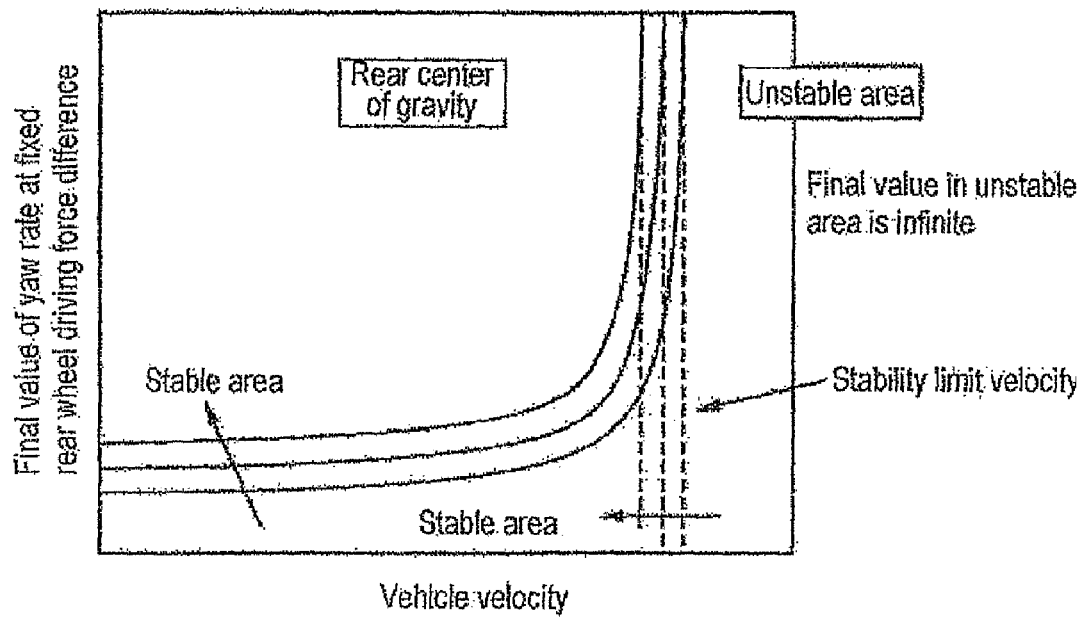
FIG. 2 is a chart that illustrates changes in steady-state values which correspond to certain operation amounts in accordance with changes in vehicle velocity and weight distribution.

Then, when a fixed rear wheel transverse driving force difference is applied, the steady-state value of the yaw rate increases as the stable limit velocity is approached as shown in FIG. 2. Although it is not shown, the same characteristic is also observed when a front wheel steering angle DF and a rear wheel steering angle DR are input, and the same characteristic is demonstrated not only with respect to yaw rate $\gamma$, but also with respect to the transverse force and transverse sliding angle of the vehicle. In addition, as shown by Equation (1) and in FIG. 2, when the vehicle parameter at the center of gravity is assumed to be constant, the stable limit velocity is reduced as the center of gravity is shifted rearward (as $L_f$ becomes longer and $L_r$ becomes shorter).

Therefore, when a vehicle 1 has its center of gravity toward the rear, a vehicle 1 with a high level of turning performance can be realized by taking advantage of the high yaw rate, which requires only a small amount of operation. However, for an unstable vehicle to make a necessary turn in a situation where a quick turn is not required, the vehicular motion characteristic and the unstable velocity area can be stabilized by a vehicle stabilization control executed by integration controller 30, which will be described below.

Figure 3:
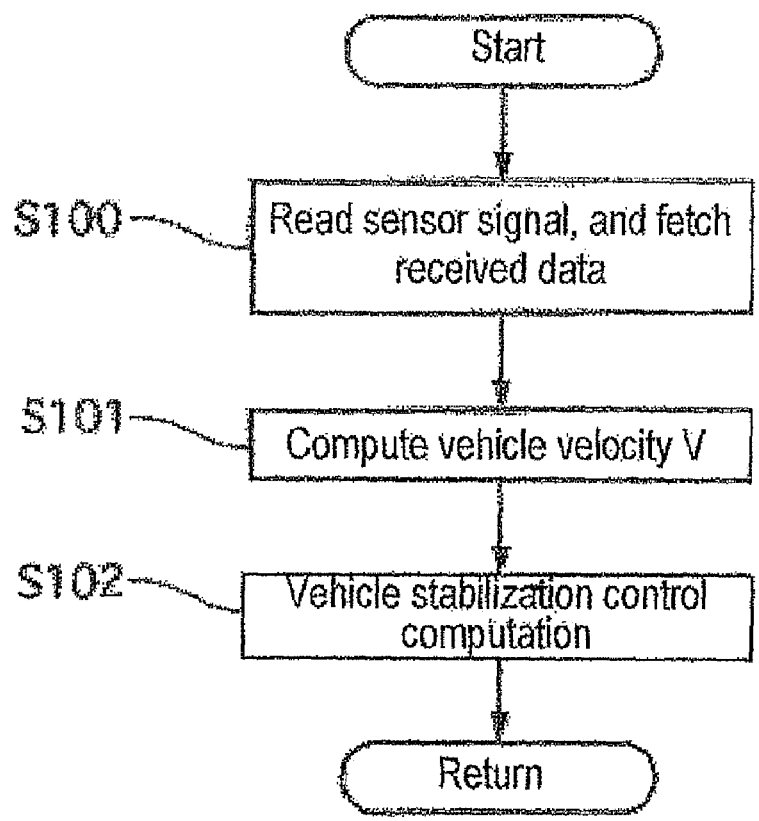
FIG. 3 is a flow chart showing a process flow of a vehicle stabilization control processing computed by the first embodiment of the controller.

FIG. 3 is a flow chart showing a process flow of a vehicle stabilization control processing to be computed by integration controller 30. Integration controller 30 is equipped with peripheral components, such as a RAM and ROM, in addition to a microcomputer; and it executes the processes in flow chart in FIG. 3 at a fixed time interval, for example, every 5 ms.

First, in Step S100, sensor signals and signals received from drive circuits 5RL and 5RR are stored in RAM parameters, and a transition is made to Step S101. More specifically, accelerator opening level AP0 signal is stored in parameter APS (in %; 100% when fully opened), a rotation angle signal STR of steering 11 is stored in a parameter (in radians, where the counterclockwise direction is taken as positive), and a vehicle yaw rate signal is stored in parameter $\gamma$ (where the direction when making a left turn is taken as positive in FIG. 1). Similarly, for the signals received from drive circuits 5RL and 5RR, output torques of motors 3RL and 3RR are stored in parameters TRL and TRR (in Nm for both, where the direction of vehicle acceleration is taken as positive) and the rotation velocities of the respective motors are stored in parameters NRL and NRR (in rad/s for both; the direction wherein the vehicle moves forward is taken as positive).

In Step S101, velocity V (in m/s; the direction wherein the vehicle moves forward is taken as positive) of the vehicle is computed using Equation (2) given below, and a transition is made to Step S102.

$$V = (NRL + NRR) \times R/GG/2 \qquad (2)$$

In Equation (2), R represents the wheel radius, and GG represents the velocity reduction ratio of the velocity reducer 4RL, 4RR.

Figure 4:
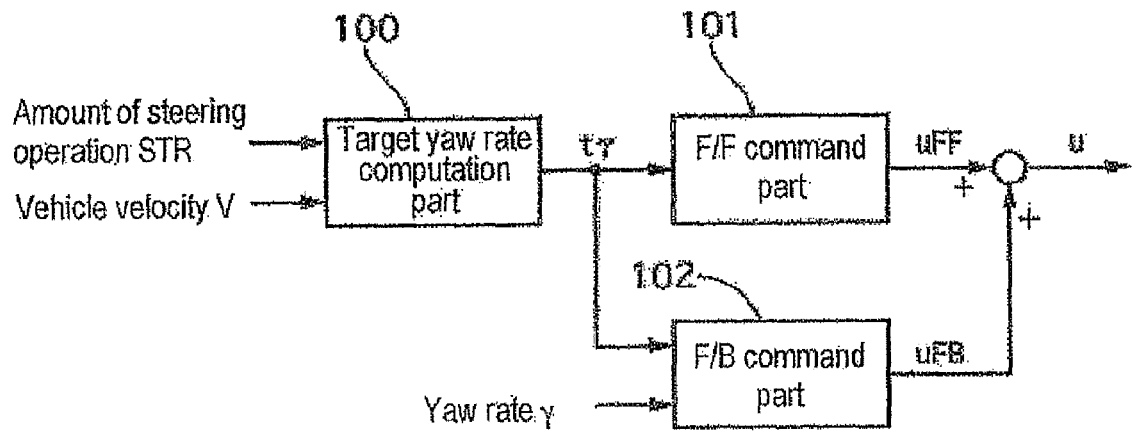
FIG. 4 is a diagram of a vehicle stabilization control computation block in the first embodiment of the controller.

In Step S102, vehicle stabilization control computation processing (FIG. 5) by a vehicle stabilization control computation block (FIG. 4) of integration controller 30 is executed, and a transition is made to Return.

Figure 5:
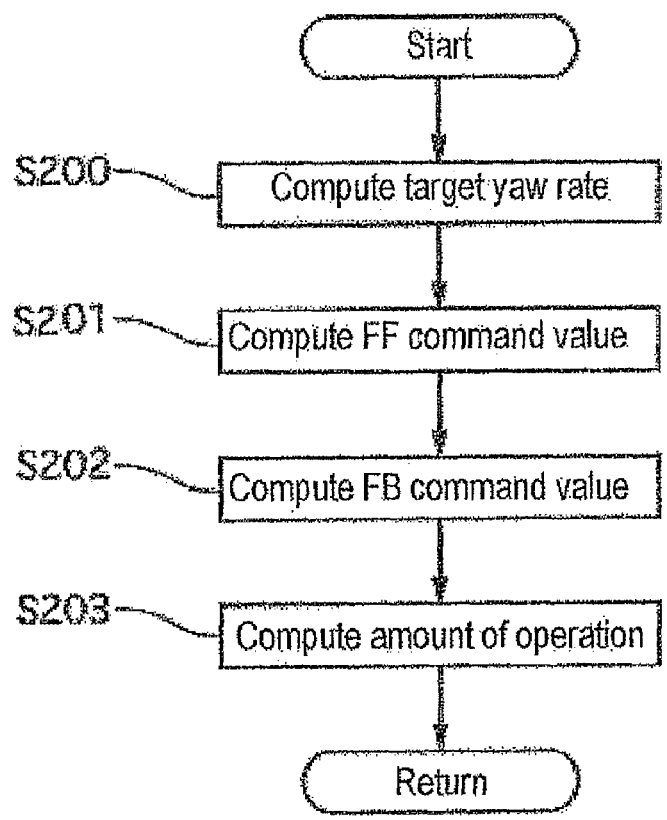
FIG. 5 is a flow chart showing a process flow of the vehicle stabilization control processing performed by the first embodiment of the controller.

FIG. 5 is a flow chart showing the process flow of vehicle stabilization control computation processing. Each step will be explained below.

Figure 6:
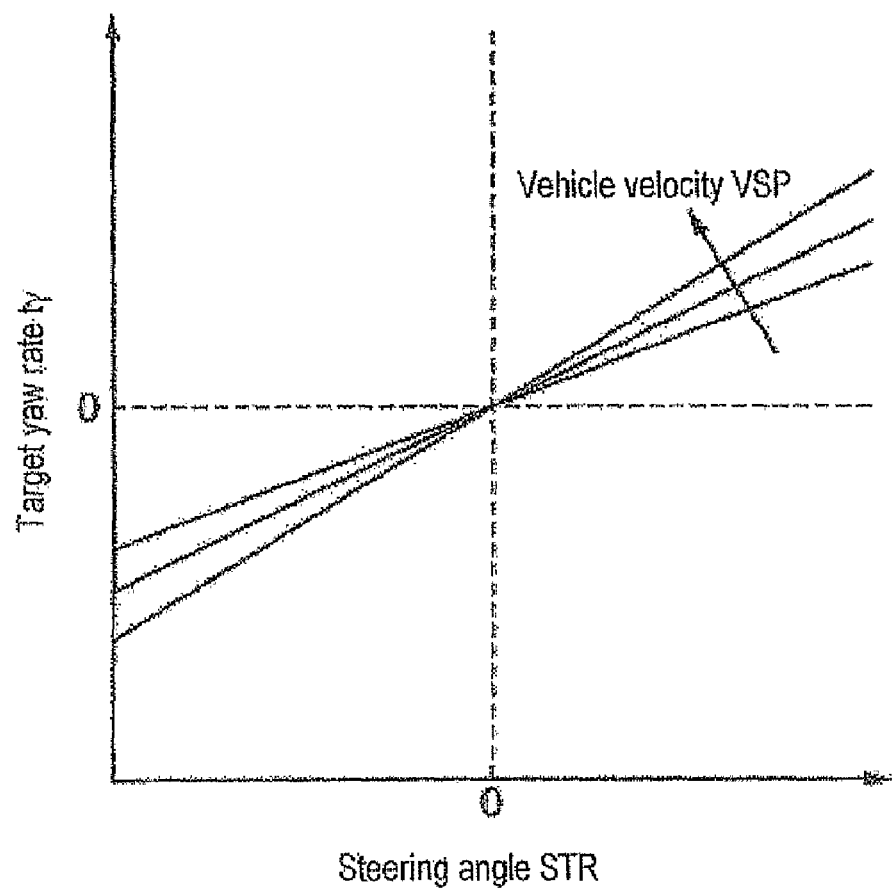
FIG. 6 is a target yaw rate map in accordance with a steering operation amount and vehicle velocity in the first embodiment.

In Step S200, a target yaw rate $t\gamma$ is computed from rotation angle signal STR of steering wheel 11 and vehicle velocity V according to the map shown in FIG. 6 at target yaw rate computation part 100, and a transition is made to Step S201. FIG. 6 is a map for setting yaw rate $t\gamma$ in accordance with rotation angle signal STR and vehicle velocity V, wherein target yaw rate $t\gamma$ is set to acquire a larger value as rotation angle signal STR and vehicle velocity V increase.

In Step S201, a feed-forward commend value uFF for realizing target yaw rate $t\gamma$ obtained in Step S200 is computed at F/F command part 101, and a transition is made to Step S202.

For example, feed-forward command value uFF is computed using a transfer function Q(s,V) for transferring from an operation amount u to yaw rate $\gamma$ according to Equation (3) given below in such a manner that yaw rate $\gamma$ becomes a response expressed by a transfer function D(s,V) for a certain response from target yaw rate $t\gamma$.

$$uFF = \frac{D(s, V)}{Q(s, V)} t\gamma \qquad (3)$$

In Equation (3), s represents a positive factor. Assuming that feed-forward command value uFF is operation amount u, the transfer function for transferring target yaw rate $t\gamma$ to yaw rate $\gamma$ can be expressed by Equation (4) given below.

$$\gamma = Q(s, V)u \qquad (4)$$
$$= Q(s) \frac{D(s, V)}{Q(s, V)} t\gamma$$
$$= D(s, V) t\gamma$$

As such, yaw rate $\gamma$ becomes the response expressed by transfer function D(s,V) from target yaw rate $t\gamma$. Although it will be explained later with reference to the explanation of vehicular motions, the amount of operation to be carried out during a steady turn with different polarities in the stable velocity area and the unstable velocity area and the amount of operation in the same direction in the stable velocity area and the unstable velocity area in the event of a change in the target yaw rate are computed automatically using Equation (3) that involves the characteristic Q(s) of the vehicle.

In Step S202, at an F/B command part 102, a feedback command value uFB is computed to compensate a deviation between target yaw rate $t\gamma$ and yaw rate $\gamma$ according to the deviation for the purposes of yaw rate stabilization and compensation of a deviation of yaw rate $\gamma$ from target yaw rate $t\gamma$ due to a model-based error that cannot be handled by feed-forward alone. A transition is then made to Step S203.

For example, a PI compensator shown by Equation (5) given below is utilized at the controlling side.

$$uFB = \frac{kPs + kI}{s} (t\gamma - \gamma) \qquad (5)$$

In Equation (5), kP represents a proportional gain, and kI represents an integral gain.

In Step S203, the sum of feed-forward command value uFF obtained in Step S201 and feedback command value uFB derived in step S202 is output as an operation amount u (turning command value), and a transition is made to Return.

Differences in the operation amount and vehicular behavior between a conventional vehicle and the vehicle of the first embodiment when traveling in the unstable velocity area will be explained below using an example of a left turn of a vehicle. Furthermore, although the operation amount will be explained as a difference between the driving forces of the rear wheels, the front wheel steering angle or the rear wheel steering angle may also be used as the operation amount.

Figure 7A:
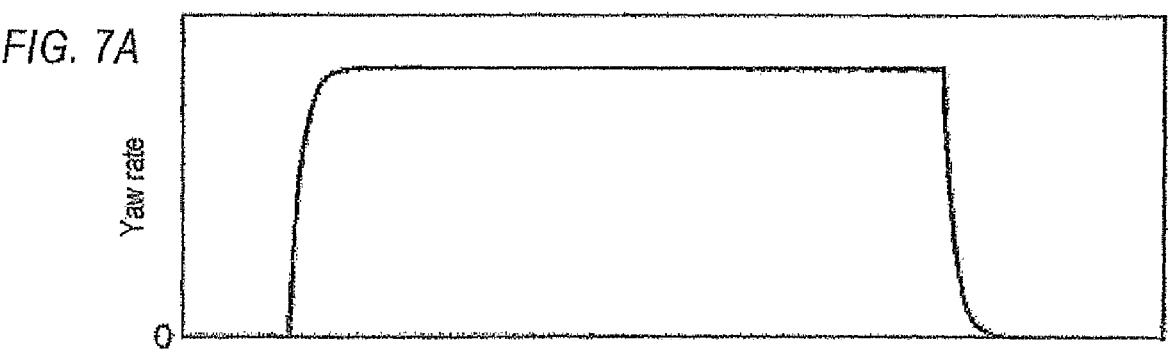
FIGS. 7A and 7B illustrate results of a left-turn simulation showing the vehicle stabilization function of the first embodiment.
Figure 7B:
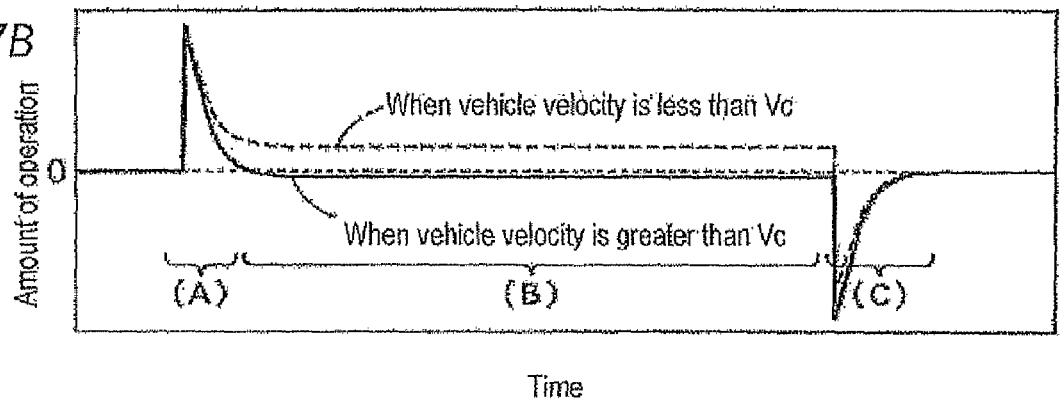
Figure 8A:
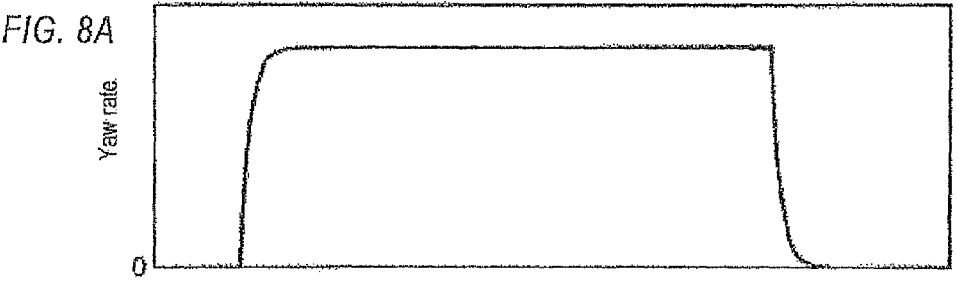
FIGS. 8A and 8B show results of a left-turn simulation showing the vehicle stabilization control function of the first embodiment.
Figure 8B:
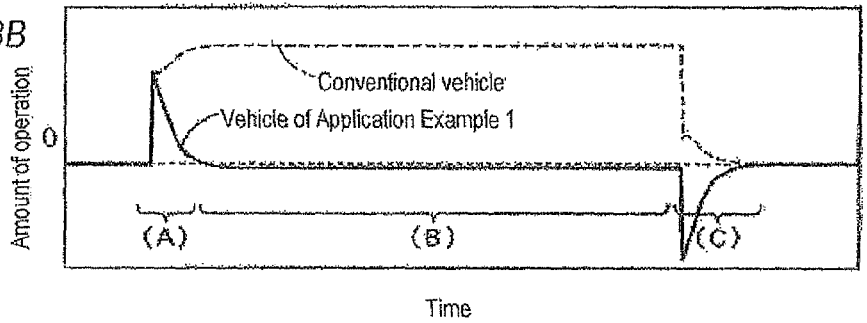

The yaw rate $\gamma$ and the operation amount (rear wheel transverse driving force difference) are shown as a function of time from the beginning of the left turn until it is completed in FIGS. 7A-7B and 8A-8B. In FIGS. 7A and 7B, a case in which the vehicle velocity of the vehicle of the first embodiment (a vehicle that becomes unstable at and beyond stable limit velocity $V_c$ if not controlled) is lower than stable limit velocity $V_c$ is indicated using a broken line, and a case in which the vehicle velocity is higher than stable limit velocity $V_c$ is indicated using a solid line. In FIGS. 8A and 8B, a case in which the vehicle velocity $V_c$ of the vehicle of the first embodiment is higher than stable limited velocity $V_c$ is indicated using a solid line, and a case in which a conventional vehicle whose stable limit velocity $V_c$ is absent below the vehicle limit velocity (vehicle that is stable without being controlled) is indicated using a broken line.

It is clear from FIGS. 7A-7B and 8A-8B that at turn start time A at which yaw rate $\gamma$ rises, the amounts of operation to be performed when the vehicle is stable without being controlled (the conventional vehicle and the vehicle of the first embodiment whose vehicle velocity is lower than $V_c$) and when the vehicle is unstable if not controlled (the vehicle in the first embodiment whose vehicle velocity is higher than $V_c$) have the same polarity and are performed in the same direction.

Next, during time zone B where a steady turn is being made at fixed yaw rate $\gamma$, the amounts of operation to be carried out when the vehicle is stable without being controlled and when the vehicle is unstable if not controlled have different polarities.

Finally, at turn completion C where yaw rate $\gamma$ returns to zero the amounts of operation to be carried out when the vehicle is stable without being controlled and when the vehicle is unstable if not controlled are in the same direction but have different polarities. In addition, while the amount of operation is simply reduced when the vehicle is stable without being controlled, the absolute value of the operation amount is first increased and then reduced to near zero when the vehicle is unstable if not controlled.

Next, reasons as to why the amount of operation differs when the vehicle is stable without being controlled and when the vehicle is unstable if not controlled will be explained.

Where a sliding angle is small, the vehicle characteristic in the transverse direction may be computed using front wheel steering angle DF, rear wheel steering angle DR and rear wheel transversal driving force difference uY as inputs in Equation (6) given below. In Equation (6), transverse sliding angle β and yaw rate γ of the vehicle are used as the state quantities.

$$\begin{bmatrix} \frac{d\beta}{dt} \\ \frac{d\gamma}{dt} \end{bmatrix} = \begin{bmatrix} a11(V) & a12(V) \\ a21 & a22 \end{bmatrix} \begin{bmatrix} \beta \\ \gamma \end{bmatrix} + \begin{bmatrix} b11(V) & b12(V) & 0 \\ b21 & b22 & b23 \end{bmatrix} \begin{bmatrix} DF \\ DR \\ uY \end{bmatrix} \quad (6)$$

In Equation (6), a11(v), a12(V), b11(V) and b12(V) represent coefficients that are determined based on the vehicle parameters and vehicle velocity V; and a21, a22, b21, b22 and b23 are constants that are determined based on the vehicle parameters. In addition, b21, b22 and b23 are determined without regard to the vehicle parameters and the vehicle velocity. Thus, the direction of the operation to be carried out when changing dγ/dt remains the same regardless of the vehicle parameters and the vehicle velocity. Therefore, at turn start time A and at turn completion time C, the amounts of operation to be carried out when the vehicle is stable without being controlled and when the vehicle is unstable if not controlled are changed in the same direction.

Figure 9:
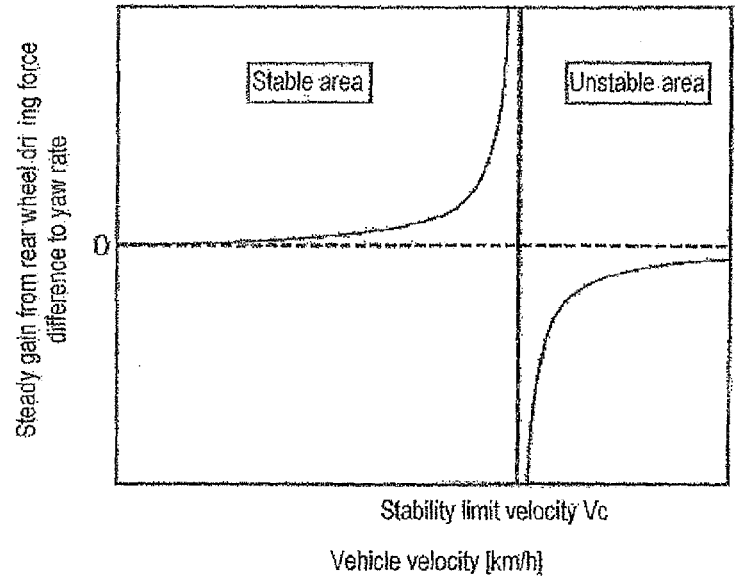
FIG. 9 is a map showing a steady gain from the rear wheel transverse driving force difference to yaw rate γ of the vehicle in the first embodiment.

A steady gain from the rear wheel transverse driving force difference of the vehicle of the first embodiment to yaw rate γ is shown in FIG. 9. In FIG. 9, $V_c$ represents the stable limit velocity, and the polarities of the steady gain in the stable area (stable velocity area) and in the unstable area (unstable velocity area) are reversed upon reaching $V_c$. Therefore, to make a steady turn while generating yaw rate γ with the same polarity at a vehicle velocity higher than $V_c$, operation amounts with different polarities are used as shown by "during steady turn" in FIGS. 7A and 7B and FIGS. 8A and 8B.

In addition, FIG. 9 shows that the near stable limit velocity $V_c$, the absolute vale of the steady gain is very high, and the amount of operation for generating the same yaw rate γ is small. The fact that the polarity of the steady gain changes on reaching the stable limit velocity $V_c$ and the fact that the steady gain becomes very high near stable limit velocity $V_c$ hold true with respect to the front wheel angle and the rear wheel angle.

Therefore, a large steady gain to the yaw rate may be used by realizing an unstable vehicle, so that a quick turn can be made by the same amount of operation. Furthermore, because only an amount of operation smaller than that with a conventional stable vehicle (vehicle with an understeering property) is needed to realize the same level of turning performance, reduction in the cost due to down-sizing of the actuators and improved fuel consumption can also be expected.

As explained above, in the case of the vehicular behavior controller 30 of the first embodiment, yaw rate γ can be generated using a small force to improve the turning performance where a quick turn is required for emergency avoidance, for example by taking advantage of the high level of yaw motion performance.

On the other hand, where an ordinary stable turn without a quick turn or when straight travel is required, vehicle stabilization control is carried out based on the flow chart shown in FIG. 5 to obtain a desired steady turning characteristic just like a conventional vehicle with an understeering characteristic.

Figure 10:
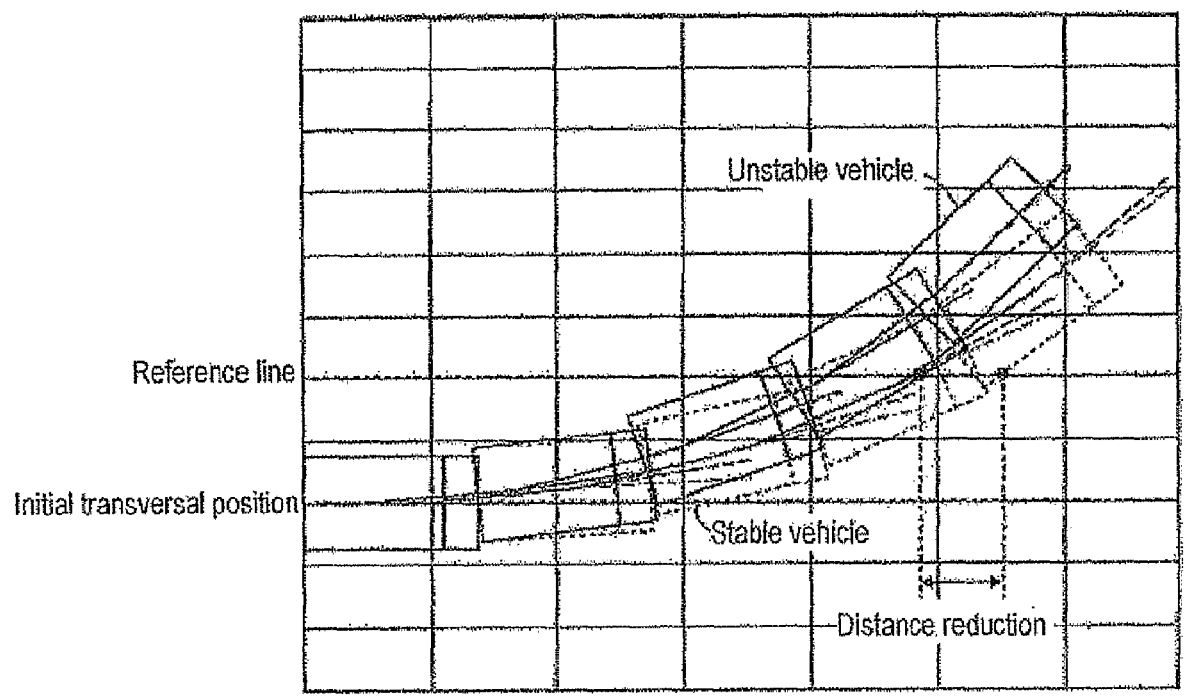
FIG. 10 shows results of an emergency avoidance simulation according to the first embodiment.

FIG. 10 shows results obtained when the front wheel steering angle, the rear wheel steering angle and the rear wheel transverse driving force difference were regulated in such a manner that a stable vehicle and a vehicle that was unstable beyond the stable limit velocity $V_c$ were able to move transversely very quickly under the same vehicle velocity. The vehicle indicated using the dotted lines is the stable vehicle, and the vehicle indicated using the solid line is the unstable vehicle. An edge of the vehicle body comes out of contact with the reference line indicated by the broken line more quickly in the case of the unstable vehicle. That is, because stable travel can be attained even at a vehicle velocity greater than stable limit velocity $V_c$ when the unstable velocity area due to the vehicle stabilization control function of the first embodiment, a turning performance and an emergency avoidance performance better than those of a conventional vehicle can be realized by taking advantage of the high level of yaw motion performance attributable to the high oversteering property.

Figure 11:
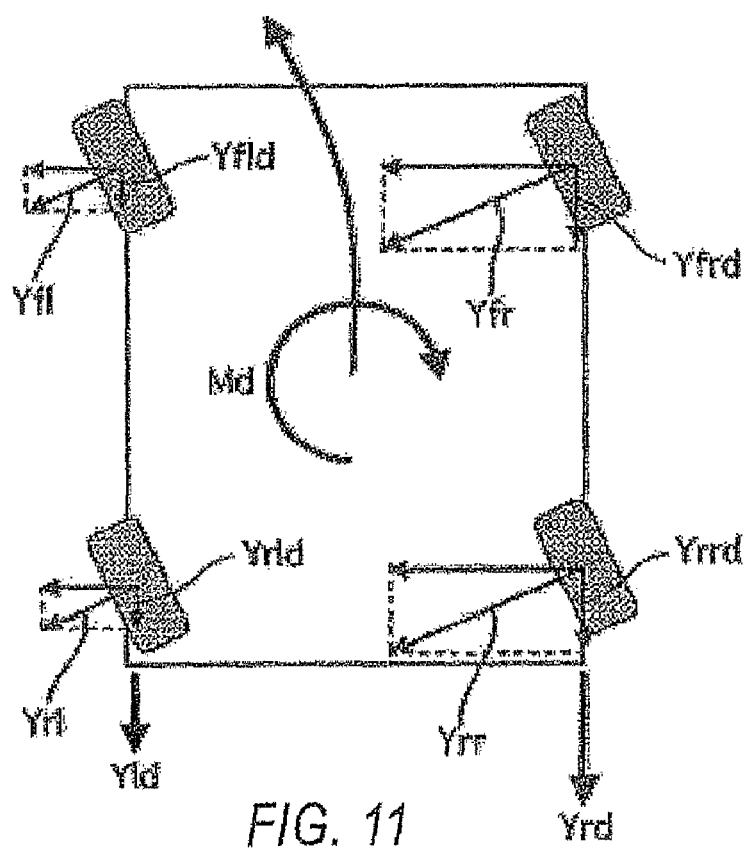
FIG. 11 is a diagram showing the effects of the first embodiment.

One of the reasons for the difference will be explained with reference to FIG. 11. The vehicle shown in FIG. 11 is traveling from the bottom to the top in the figure while making a left turn as indicated by a thick arrow. When making a left turn, the load applied to an inner race on the left side of the vehicle becomes greater than the load applied to an outer race on the right side of the vehicle due to a change in the load. For the transverse forces created at the tires by the change in the load, transverse forces Yfl and Yfr on the inner race become greater than transverse forces Yfr and Yrr on the outer race. Therefore, in terms of the force components in the longitudinal direction of the vehicle, longitudinal force components Yfrd and Yrrd on the outer race become greater than longitudinal force components Yfld and Yfrd on the inner race. Thus, yaw moment Md is created in a direction opposite to the turning direction due to the longitudinal force difference between a sum Yld of longitudinal force components Yfld and Yfrd on the inner race and a sum Yrd of longitudinal force components Yfrd and Yrrd on the outer race. Because the unstable vehicle with a higher level of yaw moment performance has less force for offsetting the moment acting as a resistance to the turning, the transverse forces to be sacrificed for the offsetting are reduced, and the transverse forces to be sacrificed for the offsetting are reduced, and the transverse motion performance may be improved compared to that of the stable vehicle as a result.

In the case of the vehicular behavior controller 30 of the first embodiment, the stabilization control mechanism carries out a stabilization operation to reverse the polarity in the stable velocity area and in the unstable velocity area with stable limit velocity $V_c$ as the boundary according to operation amount u is based on rotation angle signal STR.

As shown in FIG. 9, because the polarity of the steady gain from the rear wheel transverse driving force difference in the vehicle to yaw rate γ is reversed on reaching stable limit velocity $V_c$, an operation amount with a different polarity needs to be applied to make a steady turn while generating yaw rate γ with the same polarity at a velocity greater than $V_c$.

In contrast, when the stabilization operation is carried out in such a manner that the polarity is reversed on reaching stable limit velocity $V_c$, especially when making a steady turn, the turning characteristic of the vehicle may be stabilized through operations unique to the unstable vehicle.

In the case of the vehicular behavior controller 30 of the first embodiment, when rotation angle signal STR is changed when the vehicle velocity is greater than stable velocity limit $V_c$, the stabilization control mechanism first carries out an operation in the same direction as that carried out in the stable velocity area, and it maintains the turning state by applying an operation amount that reverses the polarity with respect to that carried out in the stable velocity area. That is, because operation amounts with different polarities need to be applied to generate the same yaw rate γ as that of the stable vehicle without being controlled when making a steady turn, the operation is first carried out in the same direction as that carried out in the stable velocity area when rotation angle signal STR is changed when the velocity is greater than stable velocity limit $V_c$. The turning state is maintained during the turning by applying an operation amount that reverses the polarity with respect to that carried out in the stable velocity area, since such a desired change in the turning amount can be realized while making a stable turn.

In the case of the vehicular behavior controller 30 of the first embodiment, the stabilization control mechanism first carries out the operation with the same polarity and in the same direction as that carried out in the aforementioned stable vehicle area at the beginning of the turn. The stabilization control mechanism maintains the turning state by applying an operation amount that reverses the polarity with respect to that carried out in the stable velocity area once the turning has begun.

That is, to generate the same yaw rate γ as that of the stable vehicle without being controlled at the beginning of the turning at which yaw rate γ arises, an operation amount with the same polarity is needed. Thus, operation with the same polarity is carried out in the same direction as that carried out in the aforementioned stable vehicle area at the beginning of the turn, and the turning state is maintained by applying an operation amount that reverses the polarity with respect to that carried out in the stable velocity area once the turning has begun, since such desired turning can be initiated from stable straight travel to stable turning.

In the case of the vehicular behavior controller 30 of the first embodiment, when completing the turn, the stabilization control mechanism first carries out an operation to increase the operation amount with the same polarity and in the same direction as that carried out in the stable velocity area, and it returns the operation amount to near zero once the turn is completed.

That is, because the operation amount with polarity opposite that in the stable velocity area but in the same direction must be generated to generate the same yaw rate γ as that of the stable vehicle without being controlled at the completion of the turn at which yaw rate γ returns to zero, an operation is first carried out to increase the operation amount with the opposite polarity and in the same direction when completing the turn. The operation amount is returned to near zero when the turn is ended, since such desired completion of the turn can be realized from stable turning to stable straight travel.

In the vehicular behavior controller 30 of the first embodiment, a turning force application mechanism is a mechanism that generates a rear wheel transverse force difference.

That is, when a turning force is applied to turn the front and the rear wheels using a rear wheel transverse force difference that allows a longitudinal force to be generated more quickly with respect to the transverse forces of the tires while using the same operation amount unique to the vehicle, more space in terms of stabilization can be created so that the vehicle can be stabilized more reliably.

In the case of the vehicular behavior controller 30 of the first embodiment, the following effects may be realized.

By providing motors 3RL and 3RR that give the vehicle turning forces, and the stabilization control mechanism (FIG. 5) that regulates the operation amounts of motors 3RL and 3RR to stabilize the turning characteristic and the straight travel property of the vehicle in the unstable velocity area beyond stable limit velocity $V_c$ where the vehicular behavior becomes unstable, a high level of turning performance, such as the turning angles of the front and rear wheels and the braking/driving force difference, which is not restricted by limitation of the operation amount by the turning force application mechanism, can be achieved while facilitating stabilization of the turning characteristic and the straight travel property of the vehicle.

Because the stabilization control mechanism carries out the stabilization operation to reverse the polarity in the stable velocity area below the stable limit and in the unstable area higher than the stable limit with stable limit velocity $V_c$ as the boundary according to operation amount u based on rotation angle signal STR, the turning characteristic of the vehicle may be stabilized through an operation unique to the unstable vehicle.

Because the stabilization control mechanism first carries out operation in the same direction as that carried out in the stable velocity area when rotation angle signal STR is changed while the vehicle velocity is higher than stable velocity $V_c$, and it maintains the turning state by applying an operation amount that reverses the polarity with respect to that carried out in the stable velocity area, a desired change in the operation amount can be realized while stably making a turn.

Because the stabilization control mechanism carries out an operation with the same polarity and in the same direction as that carried out in the stable velocity area at the beginning of turning, and it maintains the turning state by applying an operation amount that reverses the polarity with respect to that carried out in the stable velocity area once the turning has begun, a desired turn can be initiated from stable straight travel to stable turning.

Because the stabilization control mechanism carries out an operation to increase the operation amount with the same polarity and in the same direction as that carried out in the stable velocity area when completing the turn, and it returns the operation amount to near zero once the turn is completed, a desired completion of turning can be realized from stable turning to stable straight travel.

Because two motors 3RL and 3RR, which generate the rear wheel transverse driving force difference, are utilized as the turning force application mechanism, more space can be created than when steering the front and the rear wheels, so that the vehicle can be stabilized more reliably.

A case that utilizes front wheel steering angle DF and rear wheel steering angle uY for the stabilization operation amount will be shown as the second embodiment. Here, because its configuration is identical to that of the first embodiment, its illustration and explanation will be omitted. In the second embodiment, motors 3RL and 3RR and auxiliary steering motor 12 are used to configure a turning force application mechanism for applying a turning force to the vehicle.

Figure 12:
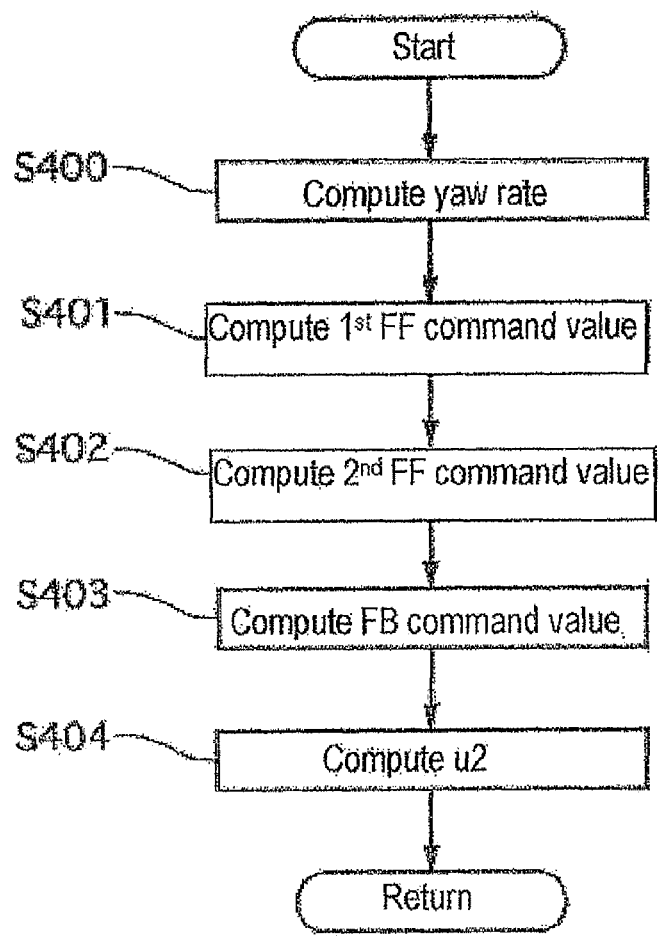
FIG. 12 is a flow chart showing the process flow of vehicle stabilization control computation processing executed by a second embodiment of an integration controller.
Figure 13:
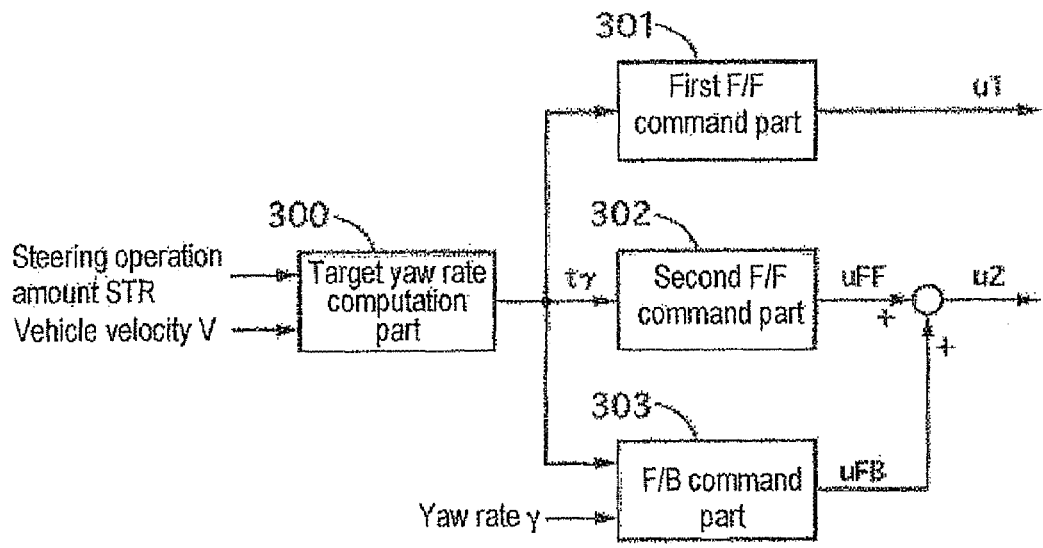
FIG. 13 is a diagram showing the vehicle stabilization control computation block of the second embodiment.

FIG. 12 is a flow chart showing the process flow of vehicle stabilization computation control processing executed by a vehicle stabilization control computation block of general controller 30 (FIG. 13). Respective steps will be explained below.

In Step S400, target yaw rate tγ is computed at target yaw rate computation part 300 from rotation angle signal STR from steering wheel 11 and vehicle velocity V according to the map shown in FIG. 6, and a transition is made to Step S401.

In Step S401, out of a feed-forward command value used for realizing target yaw rate tγ obtained in Step S400, the portion used for the operation based on the front wheel steering angle is computed at first F/F command part 301, and a transition is made to Step S402. An operation amount computed in the same manner as that in Step S201 in FIG. 5 shown with reference to the first embodiment is multiplied by a correction factor k while using the front wheel steering angle as the operation amount to compute first feed-forward operation amount u1. The feed-forward operation amount u1 is taken as a front wheel steering angle command tUF. The correction factor k indicates the portion to be allocated to the front wheel angle out of the feed-forward command value, wherein 0 indicates 0%, and 1 indicates 100%.

In Step S402, out of the feed-forward command value used for realizing obtained target yaw rate tγ, the portion used for the operation based on the rear wheel transverse driving force difference is computed at second F/F command part 302, and a transition is made to Step S403. The operation amount computed in the same manner as that in Step S201 in FIG. 5 shown with reference to the first embodiment is multiplied by (1−k) to compute second feed-forward operation amount uFF.

In Step S403, feedback command value uFB is computed in the same manner as that in Step S202 in FIG. 5 shown with reference to the first embodiment according to the deviation between target yaw rate tγ and detected yaw rate γ to compensate the deviation, and a transition is made to Step S404.

In Step S404, the sum of second feed-forward operation amount uFF obtained in Step S402 and feedback operation amount uFB obtained in Step S403 is output as a rear wheel transverse driving force difference operation amount uY, and a transition is made to Return.

Figure 14A:
FIGS. 14A to 14C show results of a left-turn simulation showing the vehicle stabilization control function in the second embodiment.
Figure 14B:
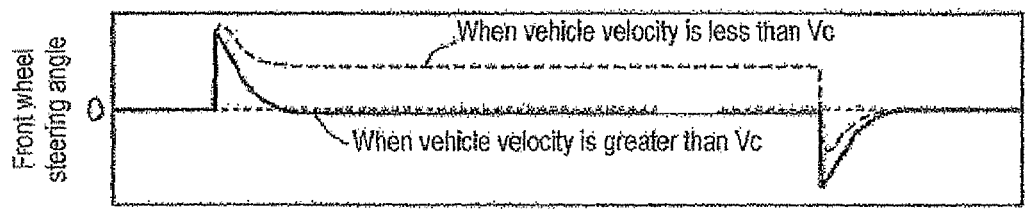
Figure 14C:
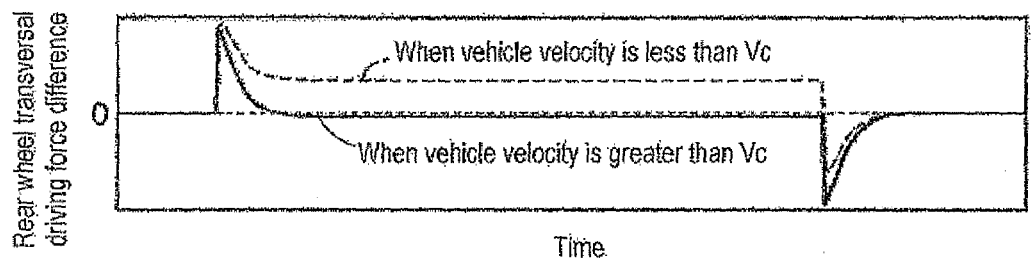

As with the first embodiment, the yaw rate, the front wheel steering angle, and the rear wheel transverse driving force difference are shown with respect to time from the beginning to the completion of making a left turn in FIGS. 14A-14C. In FIGS. 14A-14C, a case in which the vehicle velocity of the vehicle of second embodiment is lower than stable limit velocity $V_c$ is indicated using a broken line, and a case in which the vehicle velocity is higher than stable limit velocity $V_c$ is indicated using a solid line. Here, the allocation of the feed-forward command value was set at 0.5.

According to FIGS. 14A-14C, like the operation amount in the first embodiment, the operation amount of the front wheel steering angle is changed in the same direction when the vehicle velocity is lower than stable limit velocity $V_c$ and when the vehicle velocity is higher than stable limit velocity $V_c$ when the yaw rate is changed. The amounts of operation carried out when the vehicle velocity is lower than stable limit velocity $V_c$ and when the vehicle velocity is higher than stable limit velocity $V_c$ take different polarities during steady turning at a fixed yaw rate.

In the case of the vehicular behavior controller 30 of the second embodiment, multiple turning force application mechanisms are provided, and the stabilization control mechanism (FIG. 12) regulates the operation amounts of the respective multiple turning force application mechanisms. In other words, the stabilization operation is realized using two different operation amounts, that is, a front wheel steering angle and rear wheel transverse driving force difference, so that the burden of the operation amount can be spread more than that in the first embodiment, such that the cost can be reduced through down-sizing of the actuators (motors).

With the vehicular behavior controller 30 of the second embodiment, the following effect can be achieved in addition to effects described above in connection with the first embodiment.

Because multiple turning force application mechanisms are provided, and the stabilization mechanism (FIG. 12) regulates the operation amounts of the respective multiple turning force application mechanisms, the burden of the operation amount can be spread more than that in the first embodiment such that the cost can be reduced through down-sizing of the actuators (motors).

The first and second embodiments described above are preferred. However, specific configurations of the present invention are not restricted to the first and second embodiments, and design modifications are also contemplated in the present invention.

Although the physical amount to be stabilized was described in terms of yaw rate in the first and second embodiments, the invention is not restricted to the yaw rate. That is, any physical amount may be used as long as it shows a dispersive tendency in the event of instability; that is, a lateral force, a yaw moment or a lateral acceleration, for example, may be used to this end.

Furthermore, although the description in first and second embodiments indicated that the rear wheel transverse driving force difference was mainly considered as the operation amount while the front wheel steering angle or the rear wheel steering angle might also be considered, any kind of operation amount, for example, the front wheel transverse driving force difference, anteroposterior wheel driving force difference or independent transversal steering can be used as long as it can be used to manipulate a physical amount (yaw moment) that indicates a given turning state of the vehicle. Also, the selection of only one operation amount as the stabilization operation amount is not necessary, and two or more operation amounts may be combined according to the characteristics of a given system.

The computation of feed-forward command value uFF is not restricted to the methods shown in the first and second embodiments. For example, it may be computed using a map prepared in advance according to a target yaw rate and the amount of its change. In addition, H∞ control theory or sliding mode control rules may be utilized as a method for computing feedback command value uFB.

Although cases in which the vehicular behavior controller of the present disclosure was applied to an electric automobile were shown in first and second embodiments, it can be applied to any vehicle, such as a gasoline-powered car or a hybrid car, while attaining the same effects as those of first and second embodiments.

The preceding description has been presented only to illustrate and describe exemplary embodiments of the claimed invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A vehicular behavior controller, comprising:
   a turning force application mechanism that applies a turning force to a vehicle; and a stabilization controller configured to regulate the turning force application mechanism to stabilize a turning characteristic and a straight travel property of the vehicle while in an unstable velocity area when the velocity of the vehicle is faster than a stable limit velocity by selectively reversing the polarity of the operation amount of the turning force application mechanism, wherein the turning force application mechanism is configured to generate a rear wheel transverse driving force difference, and a driving force difference between left and right wheels is used as the operation amount.

2. The vehicular behavior controller of claim 1, wherein the stabilization controller is configured to carry out stabilization operations in such a manner that the polarity of the operation amount is reversed when the velocity of the vehicle is faster than the stable limit velocity in the unstable velocity area relative to the operation amount to be applied when the velocity of the vehicle is less than the stable limit velocity in a stable velocity area.

3. The vehicular behavior controller of claim 2, wherein the stabilization mechanism is configured to carry out stabilization operations in such a manner that the polarity of the operation amount is reversed when the velocity of the vehicle is in the unstable velocity area when the velocity of the vehicle is faster than the stable limit velocity.

4. The vehicular behavior controller of claim 2, wherein:
the stabilization controller is configured to first carry out a steering operation in a direction as that carried out in the stable velocity area when a driver makes a turning operation in the unstable velocity area, and to subsequently carry out the steering operation in a direction in which the polarity of the operation amount is reversed from that carried out in the stable velocity area.

5. The vehicular behavior controller of claim 1, wherein:
the stabilization control mechanism is configured to first carry out an operation with the same polarity and in the same direction as in the stable velocity area when ending a turn, and subsequently to return the operation amount to near zero when the turn is ended.

6. A vehicular behavior controller, comprising:
a turning force application mechanism that applies a turning force to a vehicle; and
a stabilization controller configured to regulate the turning force application mechanism in such a manner that a turning characteristic and a straight travel property of the vehicle are stabilized while in an unstable velocity area when the velocity of the vehicle is faster than a stable limit velocity, wherein the stabilization controller is configured to first carry out an operation with the same polarity and in the same direction as carried out in a stable velocity area at the beginning of a turn, and to subsequently control at an operation amount at which the polarity is reversed from that in the stable velocity area.

7. The vehicular behavior controller of claim 1, further comprising:
multiple turning force application units of the turning force application mechanism, and wherein the stabilization control mechanism controls respective operation amounts of the multiple turning force application units.

8. A vehicular behavior controller, comprising:
a turning force application mechanism that applies a turning force to a vehicle;
vehicle parameters that define an unstable velocity area below a predetermined maximum velocity capability of the vehicle where the behavior of the vehicle becomes unstable; and
a stabilization control mechanism configured to control the turning force application mechanism to apply a force in a direction that stabilizes the vehicle that has become unstable in a stable velocity area, wherein the stabilization control mechanism is configured to first carry out an operation with the same polarity and in the same direction as in the stable velocity area when ending a turn, and subsequently to return an operation amount to near zero when the turn is ended.

9. A vehicular behavior controller, comprising:
means for applying a turning force to a vehicle; and
means for regulating an amount the means for applying the turning force is operated in a direction that stabilizes a turning characteristic and a straight travel property of the vehicle while in an unstable velocity area when vehicular motions have become unstable; wherein the means for applying a turning force includes means for generating a rear wheel transverse driving force difference, and wherein an operation amount is a difference between the driving forces of left and right wheels.

* * * * *